US012331186B2

(12) United States Patent
Sales Fernandez et al.

(10) Patent No.: US 12,331,186 B2
(45) Date of Patent: Jun. 17, 2025

(54) PROCESS FOR PRODUCING POLYPROPYLENE COMPOSITION

(71) Applicant: SABIC GLOBAL TECHNOLOGIES B.V., Bergen op Zoom (NL)

(72) Inventors: Jose Sales Fernandez, Geleen (NL); Ronald Julianus Peter Schipper, Geleen (NL); Willy Joseph Dijsselbloem, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 803 days.

(21) Appl. No.: 17/611,281

(22) PCT Filed: May 11, 2020

(86) PCT No.: PCT/EP2020/063048
§ 371 (c)(1),
(2) Date: Nov. 15, 2021

(87) PCT Pub. No.: WO2020/234024
PCT Pub. Date: Nov. 26, 2020

(65) Prior Publication Data
US 2022/0204748 A1 Jun. 30, 2022

(30) Foreign Application Priority Data
May 17, 2019 (EP) .................................... 19175018

(51) Int. Cl.
*C08L 53/00* (2006.01)
*C08J 3/00* (2006.01)
*C08J 3/22* (2006.01)

(52) U.S. Cl.
CPC .............. *C08L 53/00* (2013.01); *C08J 3/005* (2013.01); *C08J 3/226* (2013.01); C08J 2353/00 (2013.01); C08J 2453/00 (2013.01); C08L 2205/025 (2013.01); C08L 2310/00 (2013.01)

(58) Field of Classification Search
USPC .......................................................... 523/351
See application file for complete search history.

(56) References Cited

U.S. PATENT DOCUMENTS

| 4,338,233 A | 7/1982 | Das et al. |
| 5,017,714 A | 5/1991 | Welborn, Jr. |
| 5,324,820 A | 6/1994 | Baxter |
| 2006/0183817 A1* | 8/2006 | Keulen ............... H01B 1/24 524/495 |
| 2010/0255237 A1* | 10/2010 | Ruemer ............... C08K 5/0083 524/413 |
| 2018/0127567 A1 | 5/2018 | Van Der Mee et al. |

FOREIGN PATENT DOCUMENTS

| EP | 0206189 B1 | 10/1990 |
| EP | 0397505 B1 | 12/1994 |
| EP | 0994978 B1 | 10/2004 |
| EP | 0921919 B1 | 7/2005 |
| EP | 1460166 B1 | 10/2015 |
| WO | 2009080281 A1 | 7/2009 |
| WO | 2014053590 A1 | 4/2014 |
| WO | 2018019762 A1 | 2/2018 |

OTHER PUBLICATIONS

International Search Report & Written Opinion; International Application No. PCT/EP2020/063048; International Filing Date May 11, 2020; Date of Mailing; Aug. 4, 2020; 11 pages.
Rault et al.; "Davelopment of a Halogen Free Flame Retardant Masterbatch for Polypropylene Fibers"; Polymers; 7 (2); pp. 220-234; (2015).

* cited by examiner

*Primary Examiner* — Fred M Teskin
(74) *Attorney, Agent, or Firm* — CANTOR COLBURN LLP

(57) ABSTRACT

The invention relates to a process for producing a polypropylene composition using a first extruder comprising successive zones comprising a first zone, a second zone, a third zone and a fourth zone and a second extruder comprising successive zones comprising a first zone and a second zone, the process comprising the steps of: 1a) introducing a first propylene-based polymer in the first zone of the first extruder, 1b) melt mixing the first propylene-based polymer in the second zone of the first extruder, 1c) adding an additive masterbatch to the mixture of step 1b) in the third zone of the first extruder and 1d) melt-mixing the mixture of step 1c) in the fourth zone of the first extruder to obtain the polypropylene composition, wherein the maximum temperature in the fourth zone of the first extruder is lower than the maximum temperature in the second zone of the first extruder and is lower than 240° C., wherein the additive masterbatch is produced in the second extruder by a process comprising the steps of: 2a) introducing a second propylene-based polymer and organic additives in the first zone of the second extruder and 2b) melt mixing the mixture of step 2a) in the second zone of the second extruder to obtain the additive masterbatch, wherein the maximum temperature in the second zone of the second extruder is lower than the maximum temperature in the second zone of the first extruder and is lower than 240° C.

11 Claims, No Drawings

PROCESS FOR PRODUCING POLYPROPYLENE COMPOSITION

CROSS REFERENCE TO RELATED APPLICATIONS

This application is a National Stage application of PCT/EP2020/063048 filed May 11, 2020, which claims the benefit of European Application No. 19175018.1, filed May 17, 2019, both of which are incorporated by reference in their entirety herein.

The present invention relates to a process for producing a polypropylene composition. The invention further relates to a process for producing sheathed continuous multifilament strands from such composition. The invention further relates to the composition and the multifilament strands obtained thereby.

Various types of inorganic and organic additives are added to polypropylene compositions at various amounts depending on needs. High throughput of production of polypropylene compositions is desirable. Organic additives such as organic flame retardants have a risk of degradation particularly at high loads and high throughput rates.

It is an objective of the invention to provide a process which allows producing a polypropylene composition with relatively high loads of organic additives at relatively high throughput rates.

Accordingly, the present invention provides a process for producing a polypropylene composition using a first extruder comprising successive zones comprising a first zone, a second zone, a third zone and a fourth zone and a second extruder comprising successive zones comprising a first zone and a second zone, the process comprising the steps of:
  1a) introducing a first propylene-based polymer in the first zone of the first extruder,
  1b) melt mixing the first propylene-based polymer in the second zone of the first extruder,
  1c) adding an additive masterbatch to the mixture of step 1b) in the third zone of the first extruder and
  1d) melt-mixing the mixture of step 1c) in the fourth zone of the first extruder at temperatures below 240° C. to obtain the polypropylene composition, wherein the maximum temperature in the fourth zone of the first extruder is lower than the maximum temperature in the second zone of the first extruder and is lower than 240° C.,
  wherein the additive masterbatch is produced in the second extruder by a process comprising the steps of:
  2a) introducing a second propylene-based polymer and organic additives in the first zone of the second extruder and
  2b) melt mixing the mixture of step 2a) in the second zone of the second extruder at temperatures below 240° C. to obtain the additive masterbatch wherein the maximum temperature in the second zone of the second extruder is lower than the maximum temperature in the second zone of the first extruder and is lower than 240° C.

According to the process of the invention, the organic additive is melt-mixed with a second propylene-based polymer to prepare a melt of a masterbatch in a separate extruder (second extruder) from the first extruder which can be performed at mild conditions. The first extruder is used for melt-mixing a first propylene-based polymer and any optional components which are less sensitive to degradation (second zone), and further melt-mixing the melt from the second zone of the first extruder with the masterbatch from the second extruder (fourth zone).

The melt-mixing in the second zone of the first extruder may advantageously be performed at a high temperature without the risk of the degradation of organic additives. Thus, the second zone may comprise one or more kneading blocks which have a large impact on the temperature of the melt. At a high throughput, the increase in the temperature caused by the kneading blocks is large. Thus, the maximum temperature of the melt may be at least 220° C. or at least 230° C. It is even possible that the maximum temperature of the melt in the second zone of the first extruder reaches 240° C. or more, for example 240 to 265° C. in the second zone.

The melt-mixing in the second zone of the second extruder is performed at low temperatures in order to avoid the risk of the degradation of the organic additives. The maximum temperature in the second zone of the second extruder is lower than the maximum temperature in the second zone of the first extruder. The maximum temperature in the second zone of the second extruder is lower than 240° C. The melt-mixing in the second zone of the second extruder is performed at temperatures below 240° C., preferably 170 to 230° C. or 180 to 210° C.

The second zone of the second extruder is coupled to the third zone of the first extruder. The third zone of the first extruder receive the mixture from the second zone of the first extruder having a high temperature and the mixture from the second zone of the second extruder having a low temperature.

The melt-mixing in the fourth zone of the first extruder is performed at temperatures between the high temperature of the mixture from the second zone of the first extruder and the low temperature of the mixture from the second zone of the second extruder. The amounts and the temperatures of the two mixtures is selected such that the melt-mixing in the fourth zone of the first extruder will be performed at temperatures below 240° C., preferably 180 to 235° C. or 190 to 230° C.

Accordingly, the organic additive is not subjected to a high temperature in the process of the invention. At the same time, a high throughput of the polypropylene composition can be achieved. This advantageously allows obtaining a composition with high amounts of organic additives at a high throughput.

For example, the process according to the invention may be performed such that the polypropylene composition is produced at a rate of e.g. 0.5 to 2.6 metric ton per hour.

The weight ratio between the mixture of step 1b) and the additive masterbatch of step 2b) may be chosen within a wide range, for example 90:10 to 10:90, 80:20 to 20:80, 70:30 to 30:70 or 60:40 to 40:60. The weight ratio between the mixture of step 1b) and the additive masterbatch of step 2b) may also be 90:10 to 50:50 or 50:50 to 10:90.

In the second extruder, degassing may be performed. The degassing reduces the water content in the additive masterbatch. Performing the degassing in the second extruder is more advantageous than performing degassing in the fourth section of the first extruder since it can be performed at a lower temperature. Performing degassing at a high temperature leads to a large amount of vapor exiting from the extruder, which has a risk of the produced composition being pushed out from the extruder. This would block the venting path and the system. According to the process of the invention, this process instability is avoided.

Additives

The polypropylene composition obtained after step 1d) according to the invention contains organic additives introduced in step 2a).

The organic additives introduced in step 2a) may comprise e.g. flame retardants, nucleating agents and clarifiers, stabilizers, release agents, peroxides, plasticizers, anti-oxidants, lubricants, antistatics, cross linking agents, scratch resistance agents, pigments and/or colorants, impact modifiers, blowing agents, acid scavengers, recycling additives, coupling agents, anti-microbials, anti-fogging additives, slip additives, anti-blocking additives and/or polymer processing aids.

In some embodiments, the amount of the organic additives with respect to the additive masterbatch of step 2b) is 10 to 80 wt %, e.g. at least 20 wt %, at least 30 wt % or at least 40 wt % and/or at most 70 wt % or at most 60 wt %.

In some embodiments, the amount of the organic additives introduced in step 2a) with respect to the polypropylene composition obtained after step 1d) according to the invention is 5 to 50 wt %, e.g. at least 10 wt %, at least 20 wt %, at least 30 wt % and/or at most 45 wt % or at most 40 wt %.

The polypropylene composition obtained after step 1d) according to the invention may comprise additives (organic or inorganic) other than the organic additives introduced in step 2a). The amount of such additives may e.g. be 0 to 5 wt %, 0.01 to 3 wt % or 0.1 to 1 wt % of the polypropylene composition obtained after step 1d) according to the invention. In preferred embodiments, the polypropylene composition obtained after step 1d) according to the invention do not comprise organic additives other than the organic additives introduced in step 2a).

Preferably, the organic additives introduced in step 2a) comprise organic flame retardants.

Preferably, the organic flame retardant is an intumescent flame retardant.

The organic flame retardant preferably comprises at least one phosphate selected from the group consisting of
  melamine phosphate,
  melamine polyphosphate,
  melamine pyrophosphate,
  piperazine phosphate,
  piperazine polyphosphate,
  piperazine pyrophosphate,
  2-methylpiperazine monophosphate,
  tricresyl phosphate,
  alkyl phosphates,
  haloalkyl phosphates,
  tetraphenyl pyrophosphate,
  poly(2-hydroxy propylene spirocyclic pentaerythritol bisphosphate) and
  poly(2,2-dimethylpropylene spirocyclic pentaerythritol bisphosphonate).

The organic flame retardant preferably comprises ammonium polyphosphate.

In some preferred embodiments, the organic flame retardant comprises ammonium polyphosphate and at least one of the above-mentioned phosphate.

In some preferred embodiments, the organic flame retardant comprises ammonium polyphosphate and at least two of the above-mentioned phosphate.

In some preferred embodiments, the organic flame retardant comprises ammonium polyphosphate, melamine polyphosphate and piperazine phosphate.

In some preferred embodiments, the organic flame retardant comprises melamine phosphate and piperazine pyrophosphate.

In step 2a), an inorganic additive such as an inorganic flame retardant, such as zinc oxide, may also be added. In some preferred embodiments, particles comprising the organic flame retardant and zinc oxide may be in the first zone of the second extruder. Preferably, the amount of zinc oxide with respect to the particles is 1 to 10 wt %.

In some preferred embodiments, the organic flame retardant comprises an aromatic phosphate ester.

In particularly preferred embodiments, the amount of the organic flame retardant introduced in step 2a) with respect to the polypropylene composition obtained after step 1d) according to the invention is 5 to 50 wt %, e.g. at least 10 wt %, at least 20 wt %, at least 30 wt % and/or at most 45 wt % or at most 40 wt %.

Propylene-Based Polymer

The first propylene-based polymer and the second propylene-based polymer may be of the same type or of different types. Suitable examples of the first propylene-based polymer and the second propylene-based polymer are described below.

The propylene-based polymer may for example be a propylene homopolymer or a random propylene-α-olefin copolymer or a heterophasic propylene copolymer.

A propylene homopolymer can be obtained by polymerizing propylene under suitable polymerization conditions. A propylene copolymer can be obtained by copolymerizing propylene and one or more other α-olefins, preferably ethylene, under suitable polymerization conditions. The preparation of propylene homopolymers and copolymers is, for example, described in Moore, E. P. (1996) Polypropylene Handbook. Polymerization, Characterization, Properties, Processing, Applications, Hanser Publishers: New York.

The α-olefin in the random propylene α-olefin copolymer is for example an α-olefin chosen from the group of α-olefin having 2 or 4 to 10 C-atoms, preferably ethylene, 1-butene, 1-hexene or any mixtures thereof. The amount of α-olefin is preferably at most 1 wt % based on the propylene α-olefin copolymer, for example in the range from 2-7 wt % based on the propylene α-olefin copolymer.

Polypropylenes can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art.

Heterophasic propylene copolymers are generally prepared in one or more reactors, by polymerization of propylene in the presence of a catalyst and subsequent polymerization of a propylene-α-olefin mixture. The resulting polymeric materials are heterophasic, but the specific morphology usually depends on the preparation method and monomer ratio.

The heterophasic propylene copolymer as defined herein consists of a propylene-based matrix and a dispersed ethylene-α-olefin copolymer.

The propylene-based matrix typically forms the continuous phase in the heterophasic propylene copolymer.

The propylene-based matrix consists of a propylene homopolymer and/or a propylene-α-olefin copolymer consisting of at least 70% by mass of propylene and up to 30% by mass of α-olefin, for example ethylene, for example consisting of at least 80% by mass of propylene and up to 20% by mass of α-olefin, for example consisting of at least 90% by mass of propylene and up to 10% by mass of α-olefin, based on the total mass of the propylene-based matrix.

Preferably, the α-olefin in the propylene-α-olefin copolymer is selected from the group of α-olefins having 2 or 4-10 carbon atoms and is preferably ethylene. Preferably, the propylene-based matrix consists of a propylene homopolymer.

The melt flow index (MFI) of the propylene-based matrix (before it is mixed into the composition of the invention) may be in the range of for example 0.3 to 200 dg/min as measured according to ISO1133 (2.16 kg/230° C.).

The propylene-based matrix is for example present in an amount of 50 to 85 wt % based on the total heterophasic propylene copolymer.

Besides the propylene-based matrix, the heterophasic propylene copolymer also consists of a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form.

The MFI of the dispersed ethylene α-olefin copolymer may vary between wide range and may for example be in the range from for example be in the range from 0.001 to 10 dg/min (measured according to ISO1133 (2.16 kg/230° C. as calculated using the following formula:

$$MFR\ EPR = 10^{\wedge}\left(\frac{Log\ MFR\ \text{heterophasic} - \text{matrix content} * Log\ MFR\ PP}{\text{rubber content}}\right)$$

wherein MFR heterophasic is the melt flow rate of the heterophasic propylene copolymer measured according to ISO1133 (2.16 kg/230° C.), MFR PP is the MFR of the propylene-based matrix of the heterophasic propylene copolymer measured according to ISO1133 (2.16 kg/230° C.)

matrix content is the amount of propylene-based matrix in the heterophasic propylene copolymer in wt % and rubber content is the amount of ethylene α-olefin copolymer in the heterophasic propylene copolymer in wt %.

The dispersed ethylene-α-olefin copolymer is for example present in an amount of 50 to 15 wt % based on the total heterophasic propylene copolymer.

For example, the amount of ethylene in the ethylene-α-olefin copolymer (RCC2) is in the range of 20-65 wt % based on the ethylene-α-olefin copolymer.

The amounts of the propylene-based matrix and the dispersed ethylene-α-olefin copolymer, as well as the amount of ethylene in the ethylene α-olefin copolymer may be determined by $^{13}$C-NMR, as is well known in the art.

In the heterophasic polypropylene, the sum of the total weight of the propylene-based matrix and the total weight of the dispersed ethylene-α-olefin copolymer is 100 wt %

The α-olefin in the ethylene-α-olefin copolymer is preferably chosen from the group of α-olefins having 3 to 8 carbon atoms and any mixtures thereof, preferably the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer. Examples of suitable α-olefins having 3 to 8 carbon atoms, which may be employed as ethylene comonomers to form the ethylene α-olefin copolymer include but are not limited to propylene, 1-butene, 1-pentene, 4-methyl-1-pentene, 1-hexen, 1-heptene and 1-octene.

The elastomer of ethylene and α-olefin comonomer having 4 to 8 carbon atoms may for example have a density in the range from 0.850 to 0.915 g/cm$^3$. Such elastomers are sometimes also referred to as plastomers.

The α-olefin comonomer in the elastomer is preferably an acyclic monoolefin such as 1-butene, 1-pentene, 1-hexene, 1-octene, or 4-methylpentene.

Accordingly, the elastomer is preferably selected from the group consisting of ethylene-1-butene copolymer, ethylene-1-hexene copolymer, ethylene-1-octene copolymer and mixtures thereof, more preferably wherein the elastomer is selected from ethylene-1-octene copolymer. Most preferably, the elastomer is an ethylene-1-octene copolymer.

Preferably, the density of the elastomer is at least 0.865 g/cm$^3$ and/or at most 0.910 g/cm$^3$. For example, the density of the elastomer is at least 0.850, for example at least 0.865, for example at least 0.88, for example at least 0.90 and/or for example at most 0.915, for example at most 0.910, for example at most 0.907, for example at most 0.906 g/cm$^3$. More preferable the density of the elastomer is in the range from 0.88 up to an including 0.907 g/cm$^3$, most preferably, the density of the elastomer is in the range from 0.90 up to and including 0.906 g/cm$^3$.

Elastomers which are suitable for use in the current invention are commercially available for example under the trademark EXACT™ available from Exxon Chemical Company of Houston, Texas or under the trademark ENGAGE™ polymers, a line of metallocene catalyzed plastomers available from Dow Chemical Company of Midland, Michigan or under the trademark TAFMER™ available from MITSUI Chemicals Group of Minato Tokyo or under the trademark Nexlene™ from SK Chemicals.

The elastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The elastomer s may also be prepared using traditional types of heterogeneous multi-sited Ziegler-Natta catalysts.

Preferably, the elastomer has a melt flow index of 0.1 to 40 dg/min (ISO1133, 2.16 kg, 190° C.), for example at least 1 dg/min and/or at most 35 dg/min. More preferably, the elastomer has a melt flow index of at least 1.5 dg/min, for example of at least 2 dg/min, for example of at least 2.5 dg/min, for example of at least 3 dg/min, more preferably at least 5 dg/min and/or preferably at most 30 dg/min, more preferably at most 20 dg/min, more preferably at most 10 dg/min measured in accordance with ISO 1133 using a 2.16 kg weight and at a temperature of 190° C.

Preferably, the amount of ethylene incorporated into the elastomer is at least 50 mol %. More preferably, the amount of ethylene incorporated into the elastomer is at least 57 mol %, for example at least 60 mol %, at least 65 mol % or at least 70 mol %. Even more preferably, the amount of ethylene incorporated into the elastomer is at least 75 mol %. The amount of ethylene incorporated into the elastomer may typically be at most 97.5 mol %, for example at most 95 mol % or at most 90 mol %.

According to another aspect, the invention relates to the polypropylene composition obtainable by or obtained by the process according to the invention. Preferably, the polypropylene composition is flame retardant, i.e. a molded part of the composition has UL94 V1 or V0 rating at a thickness of 3.0 mm (±10%) and/or UL94 V1 or V0 rating at a thickness of 1.5 mm (±10%).

The polypropylene composition may be made into pellets. The pellets may be moulded into (semi-)finished articles. Suitable examples of moulding processes include injection moulding, compression moulding, extrusion and extrusion compression moulding. Injection moulding is widely used to produce articles such as automotive exterior parts like bumpers, automotive interior parts like instrument panels, or automotive parts under the bonnet. Extrusion is widely used to produce articles such rods, sheets and pipes. The invention also relates to such moulded articles.

Sheathed Continuous Multifilament Strands

In particularly preferred embodiments, the polypropylene composition of the invention is used in a process for the production of sheathed continuous multifilament strands.

In a process for the production of sheathed continuous multifilament strands, a melt of a thermoplastic composition is applied around continuous glass multifilament strands to obtain the sheathed continuous multifilament strands. Such process is described in detail in WO2009/080281A1, which document is hereby incorporated by reference.

Accordingly, the invention further provides a process for the production of sheathed continuous multifilament strands, comprising the steps of:
i) unwinding continuous glass multifilament strands from a package,
ii) applying an impregnating agent to the continuous glass multifilament strands to form the impregnated continuous multifilament strands and
iii) applying a sheath of the polypropylene composition according to the invention around the impregnated continuous multifilament strands to form the sheathed continuous multifilament strands.

It is possible to provide the polypropylene composition of the invention in a solid form and subsequently melt it for the process for the production of sheathed continuous multifilament strands.

However, preferably, the melt of the polypropylene composition obtained by step d) of the process according to the invention for producing the polypropylene composition is directly used for step iii) of the process according to the invention for the production of sheathed continuous multifilament strands without solidification. This means that the fourth zone of the first extruder is coupled to the unit for performing step iii) which receives the melt from the fourth zone of the first extruder as well as the impregnated continuous multifilament strands. The melt of the polypropylene composition obtained by step d) is thus directly used for step iii). Thus, in these cases, the process according to the invention for producing the polypropylene composition and the process according to the invention for the production of sheathed continuous multifilament strands are performed continuously. This has an advantage that the process for the production of sheathed continuous multifilament strands can be performed at a large throughput since the polypropylene composition used for step iii) can be provided at a large throughput.

Each core of a sheathed continuous multifilament strands comprises an impregnated continuous multifilament strands, for example one or more impregnated continuous multifilament strands. Preferably, the one or more impregnated continuous multifilament strands form at least 90 wt %, more preferably at least 93 wt %, even more preferably at least 95 wt %, even more preferably at least 97 wt %, even more preferably at least 98 wt %, for example at least 99 wt % of the core. In a preferred embodiment, each core consists of the one or more impregnated continuous multifilament strands.

The impregnated continuous multifilament strand is prepared from a continuous glass multifilament strand and an impregnating agent.

The sheathed continuous multifilament strands comprises a core that extends in the longitudinal direction and a polymer sheath which intimately surrounds said core.

The term intimately surrounding as used herein is to be understood as meaning that the polymer sheath substantially entirely contacts the core. Said in another way the sheath is applied in such a manner onto the core that there is no deliberate gap between an inner surface of the sheath and the core containing the impregnated continuous mutifilament strands. A skilled person will nevertheless understand that a certain small gap between the polymer sheath and the glass filaments may be formed as a result of process variations. Preferably, therefore, the polymer sheath comprises less than 5 wt. % of said filament, preferably less than 2 wt. % of filament based on the total weight of the polymer sheath.

Preferably, the thickness of the polymer sheath in the sheathed continuous multifilament strand is between 500 and 1500 micrometer.

Glass fibres are generally supplied as a plurality of continuous, very long filaments, and can be in the form of strands, rovings or yarns. A filament is an individual fibre of reinforcing material. A strand is a plurality of bundled filaments. Yarns are collections of strands, for example strands twisted together. A roving refers to a collection of strands wound into a package.

For purpose of the invention, a glass multifilament strand is defined as a plurality of bundled glass filaments.

Glass multifilament strands and their preparation are known in the art.

The filament density of the continuous glass multifilament strand may vary within wide limits. For example, the continuous glass multifilament strand may have at least 500, for example at least 1000 glass filaments/strand and/or at most 10000, for example at most 5000 grams per 1000 meter. Preferably, the amount of glass filaments/strands is in the range from 500 to 10000 grams per 1000 meterglass filaments/strand.

The thickness of the glass filaments is preferably in the range from 5 to 50 μm, more preferably from 10 to 30 μm, even more preferably from 15 to 25 μm. Usually the glass filaments are circular in cross section meaning the thickness as defined above would mean diameter. The glass filaments are generally circular in cross section.

The length of the glass filaments is in principle not limited as it is substantially equal to the length of the sheathed continuous multifilament strand. For practical reasons of being able to handle the tape however, it may be necessary to cut the sheathed continuous multifilament strand into a shorter strand. For example the length of the sheathed continuous multifilament strand is at least 1 m, for example at least 10 m, for example at least 50 m, for example at least 100 m, for example at least 250 m, for example at least 500 m and/or for example at most 25 km, for example at most 10 km.

The continuous glass multifilament strand in the tape of the invention comprises at most 2 wt %, preferably in the range from 0.10 to 1 wt % of a sizing based on the continuous glass multifilament strand. The amount of sizing can be determined using ISO 1887:2014.

A sizing composition is typically applied to the glass filaments before the glass filaments are bundled into a continuous glass multifilament strand.

Suitable examples of sizing compositions include solvent-based compositions, such as an organic material dissolved in aqueous solutions or dispersed in water and melt- or radiation cure-based compositions. Preferably, the sizing composition is an aqueous sizing composition.

As described in the art, e.g. in documents EP1460166A1, EP0206189A1 or U.S. Pat. No. 4,338,233, the aqueous sizing composition may include film formers, coupling agents and other additional components.

The film formers are generally present in effective amount to protect fibres from interfilament abrasion and to provide integrity and processability for fibre strands after they are dried. Suitable film formers are miscible with the polymer to be reinforced. For example; for reinforcing polypropylenes, suitable film formers generally comprise polyolefin waxes.

The coupling agents are generally used to improve the adhesion between the matrix thermoplastic polymer and the fibre reinforcements. Suitable examples of coupling agents known in the art as being used for the glass fibres include organofunctional silanes. More particularly, the coupling agent which has been added to the sizing composition is an aminosilane, such as aminomethyl-trimethoxysilane, N-(beta-aminoethyl)-gamma-aminopropyl-trimethoxysilane, gamma-aminopropyl-trimethoxysilane gamma-methylaminopropyl-trimethoxysilane, delta-aminobutyl-triethoxysilane, 1,4-aminophenyl-trimethoxysilane. Preferably, in the tape of the invention, the sizing composition contains an aminosilane to enable a good adhesion to the thermoplastic matrix. The sizing composition may further comprise any other additional components known to the person skilled in the art to be suitable for sizing compositions. Suitable examples include but are not limited to lubricants (used to prevent damage to the strands by abrasion) antistatic agents, crosslinking agents, plasticizers, surfactants, nucleation agents, antioxidants, pigments as well as mixtures thereof.

Typically, after applying the sizing composition to the glass filaments, the filaments are bundled into the continuous glass multifilament strands and then wound onto bobbins to form a package.

The impregnated continuous multifilament strand is prepared from a continuous glass multifilament strand and an impregnating agent and in particular by applying an impregnating agent to the continuous glass multifilament strand in an amount from 0.50 to 10% wt % based on the sheathed continuous multifilament strands.

The optimal amount of impregnating agent applied to the continuous glass multifilament strand depends on the polymer sheath, on the size (diameter) of the glass filaments forming the continuous glass strand, and on the type of sizing composition. Typically, the amount of impregnating agent applied to the continuous glass multifilament strand is at least 0.50 wt %, preferably at least 1.0 wt %, preferably at least 1.5 wt %, preferably at least 2 wt %, preferably at least 2.5 wt % and/or at most 10.0 wt %, preferably at most 9.0 wt %, more preferably at most 8.0 wt %, even more preferably at most 7.0 wt %, even more preferably at most 6.0 wt %, even more preferably at most 5.5 wt % based on the amount of sheathed continuous multifilament strands. Preferably, the amount of impregnating agent is in the range from 1.5 to 8 wt %, even more preferably in the range from 2.5 wt % to 6.0 wt % based on the sheathed continuous multifilament strand. A higher amount of impregnating agent increases the Impact Energy per unit of thickness (J/mm). However, for reasons of cost-effectiveness and low emissions (volatile organic compounds) and mechanical properties, the amount of impregnating agent should also not become too high.

For example, the ratio of impregnating agent to continuous glass multifilament strand is in the range from 1:4 to 1:30, preferably in the range from 1:5 to 1:20.

The viscosity of the impregnating agent is in the range from 2.5 to 200 cSt at 160° C., preferably at least 5.0 cSt, more preferably at least 7.0 cSt and/or at most 150.0 cSt, preferably at most 125.0 cSt, preferably at most 100.0 cSt at 160° C.

An impregnating agent having a viscosity higher than 100 cSt is difficult to apply to the continuous glass multifilament strand. Low viscosity is needed to facilitate good wetting performance of the fibres, but an impregnating agent having a viscosity lower than 2.5 cSt is difficult to handle, e.g., the amount to be applied is difficult to control; and the impregnating agent could become volatile. For purpose of the invention, unless otherwise stated, the viscosity of the impregnating agent is measured in accordance with ASTM D 3236-15 (standard test method for apparent viscosity of hot melt adhesives and coating materials) at 160° C.

The melting point of (that is the lowest melting temperature in a melting temperature range) the impregnating agent is at least 20° C. below the melting point of the thermoplastic polymer composition. Preferably, the impregnating agent has a melting point of at least 25 or 30° C. below the melting point of the thermoplastic polymer composition. For instance, when the thermoplastic polymer composition has a melting point of about 160° C., the melting point of the impregnating agent may be at most about 140° C.

Suitable impregnating agents are compatible with the thermoplastic polymer to be reinforced, and may even be soluble in said polymer. The skilled man can select suitable combinations based on general knowledge, and may also find such combinations in the art.

Suitable examples of impregnating agents include low molar mass compounds, for example low molar mass or oligomeric polyurethanes, polyesters such as unsaturated polyesters, polycaprolactones, polyethyleneterephthalate, poly(alpha-olefins), such as highly branched polyethylenes and polypropylenes, polyamides, such as nylons, and other hydrocarbon resins.

For reinforcing polypropylenes, the impregnating agent preferably comprises highly branched poly(alpha-olefins), such as highly branched polyethylenes, modified low molecular weight polypropylenes, mineral oils, such as, paraffin or silicon and any mixtures of these compounds.

The impregnating agent preferably comprises at least 20 wt %, more preferably at least 30 wt %, more preferably at least 50 wt %, for example at least 99.5 wt %, for example 100 wt % of a branched poly(alpha-olefin), most preferably a branched polyethylene. To allow the impregnating agent to reach a viscosity of from 2.5 to 200 cSt at 160° C., the branched poly(alpha-olefin) may be mixed with an oil, wherein the oil is chosen from the group consisting of mineral oils, such as a paraffin oil or silicon oil; hydrocarbon oils; and any mixtures thereof.

Preferably, the impregnating agent is non-volatile, and/or substantially solvent-free. In the context of the present invention, non-volatile means that the impregnating agent has a boiling point or range higher than the temperatures at which the impregnating agent is applied to the continuous multifilament glass strand. In the context of present invention, "substantially solvent-free" means that impregnating agent contains less than 10 wt % of solvent, preferably less than 5 wt % of solvent based on the impregnating agent. In a preferred embodiment, the impregnating agent does not contain any organic solvent.

The impregnating agent may further be mixed with other additives known in the art. Suitable examples include lubricants; antistatic agents; UV stabilizers; plasticizers; surfactants; nucleation agents; antioxidants; pigments; dyes; and adhesion promoters, such as a modified polypropylene having maleated reactive groups; and any combinations thereof, provided the viscosity remains within the desired range. Any method known in the art may be used for applying the liquid impregnating agent to the continuous glass multifilament strand. Suitable methods for applying the impregnating agent to the continuous multifilament strands include applicators having belts, rollers, and hot melt applicators. Such methods are for example described in documents EP0921919B1 and EP0994978B1, in EP0397505B1 and references cited therein. The method used should enable application of a constant amount of impregnating agent to the continuous multifilament strand.

Any method known in the art may be used for applying the liquid impregnating agent to the continuous strand of glass filaments. Suitable methods for applying the impregnating agent include applicators having belts, rollers, and hot melt applicators. Suitable methods are for example described in documents EP0921919, EP0994978B1, EP0397505B1, WO2014/053590A1 and references cited therein.

Preferably, the amount of impregnated continuous multifilament strand is in the range of 10 to 70 wt % based on the sheathed continuous multifilament strands and the amount of polymer sheath is in the range of 30 to 90 wt % based on the sheathed continuous multifilament strand. The sum of the amount of impregnated continuous multifilament strand and the polymer sheath is 100 wt %

According to another aspect, the invention relates to the sheathed continuous multifilament strands obtainable by or obtained by the process according to the invention. Preferably, a composition consisting of the sheathed continuous multifilament strands is flame retardant, i.e. a molded part consisting of the sheathed continuous multifilament strands has UL94 V1 or V0 rating at a thickness of 3.0 mm (±10%) and/or UL94 V1 or V0 rating at a thickness of 1.5 mm (±10%).

The process for the production of sheathed continuous multifilament strands according to the invention may further comprise a step wherein the multiple sheathed continuous glass multifilament strands are cut or chopped into long fibre pellets or granules of desired length, suitable for further processing into (semi)-finished articles. The length of the glass fibres in the pellets or granules is typically substantially the same as the pellet or granule length, and may vary from 2 to 50 mm, preferably from 5 to 30 mm, more preferably from 6 to 20 and most preferably from 10 to 16 mm.

This may be followed by a step of moulding the long glass fiber-reinforced thermoplastic polymer composition in pellet form into (semi-)finished articles. Suitable examples of moulding processes include injection moulding, compression moulding, extrusion and extrusion compression moulding. Injection moulding is widely used to produce articles such as automotive exterior parts like bumpers, automotive interior parts like instrument panels, or automotive parts under the bonnet. Extrusion is widely used to produce articles such rods, sheets and pipes.

The invention also relates to moulded articles, made from the long glass fiber-reinforced thermoplastic polymer composition as obtained with the process according to the invention.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

EXPERIMENTS

Example 1

A main extruder comprising successive zones of a first zone, a second zone, a third zone and a fourth zone was used. The second zone of the main extruder comprises kneading blocks. A side extruder comprising successive zones of a first zone and a second zone is coupled to the third zone of the main extruder. The second zone of the side extruder was equipped with a degassing means.

The composition of table 1 was fed to the first zone of the side extruder. The composition was melt-mixed in the second zone of the side extruder. The resulting masterbatch was fed to the third zone of the main extruder. The maximum temperature of the melt in the second zone of the side extruder was 200° C. The throughput of the side extruder was 800 kg/h.

The composition of table 2 (except for the masterbatch from the side extruder) was fed to the first zone of the main extruder at 350 kg/h. The composition was melt-mixed in the second zone of the main extruder. The maximum temperature in the second zone of the main extruder reached 230 to 240° C. The third zone of the main extruder receives the melt of the masterbatch from the side extruder and the melt from the second zone of the main extruder. The mixture was melt-mixed in the fourth zone of the main extruder and was extruded. The temperature of the melt was 210 to 215° C. at the beginning of the fourth zone of the main extruder and reached 235° C. at the end. The throughput of the main extruder was 1150 kg/h.

Since the flame retardant was never subjected to a temperature above 240° C., a composition comprising a high amount of non-degraded flame retardant was successfully obtained at a high throughput.

TABLE 1

| (in wt %): Side extruder | |
| --- | --- |
| PP block copolymer with MFI of 70 dg/min (230° C., 2.16 kg) (commercial name: SABIC ® PP 513MNK10) | 49.75 |
| flame retardant consisting of 64.8 wt % Piperazine pyrophosphate, 30.5 wt % Melamine phosphate, 4.7 wt % ZnO | 49.75 |
| calcium stearate | 0.5 |

TABLE 2

| (in wt %): Main extruder | |
| --- | --- |
| Masterbatch from side extruder | 68.82 |
| PP block copolymer with MFI of 70 dg/min (230° C., 2.16 kg) (commercial name: SABIC ® PP 513MNK10) | 28.51 |
| PP block copolymer with MFI of 15 dg/min (230° C., 2.16 kg) (commercial name: SABIC ® PP PHC31 MG), milled to be used as carrier for additives | 0.18 |
| stabilizers | 2.08 |
| color masterbatch | 0.41 |

Comparative Experiments

The same main extruder was used to prepare a polypropylene composition, but without the side extruder. At the same throughput as in example 1, the temperature of the melt reached 265° C. at the outlet of the main extruder. At such temperature the flame retardant is completely degraded.

In order to maintain the temperature of the melt in the main extruder below 240° C., the throughput of the main extruder had to be decreased to 30 to 50%.

The invention claimed is:

1. A process for producing a polypropylene composition using a first extruder comprising successive zones comprising a first zone, a second zone, a third zone and a fourth zone and a second extruder comprising successive zones comprising a first zone and a second zone, the process comprising the steps of:
   1a) introducing a first propylene-based polymer in the first zone of the first extruder,
   1b) melt mixing the first propylene-based polymer in the second zone of the first extruder,
   1c) adding an additive masterbatch to the mixture of step 1b) in the third zone of the first extruder and
   1d) melt-mixing the mixture of step 1c) in the fourth zone of the first extruder to obtain the polypropylene composition, wherein the maximum temperature in the fourth zone of the first extruder is lower than the maximum temperature in the second zone of the first extruder and is lower than 240° C.,
   wherein the additive masterbatch is produced in the second extruder by a process comprising the steps of:
   2a) introducing a second propylene-based polymer and organic additives in the first zone of the second extruder and
   2b) melt mixing the mixture of step 2a) in the second zone of the second extruder to obtain the additive masterbatch, wherein the maximum temperature in the second zone of the second extruder is lower than the maximum temperature in the second zone of the first extruder and is lower than 240° C.

2. The process according to claim 1, wherein maximum temperature in the second zone of the first extruder is 220 to 265° C.

3. The process according to claim 1, wherein the melt mixing in step 2b) is performed at temperatures of 170 to 230° C.

4. The process according to claim 1, wherein the melt mixing in step 1d) is performed at temperatures of 180 to 235° C.

5. The process according to claim 1, wherein the amount of the organic additives introduced in step 2a) with respect to the polypropylene composition obtained after step 1d) is 5 to 50 wt %.

6. The process according to claim 1, wherein the weight ratio between the mixture of step 1b) and the additive masterbatch of step 2b) is 90:10 to 10:90.

7. The process according to claim 1, wherein the amount of the organic additives with respect to the additive masterbatch of step 2b) is 10 to 80 wt %.

8. The process according to claim 1, wherein the organic additives comprise an organic flame retardant.

9. The process according to claim 1, wherein degassing is performed in the second extruder.

10. The process according to claim 1, wherein the first propylene-based polymer and/or the second propylene-based polymer is a propylene homopolymer, a random propylene-α-olefin copolymer or a heterophasic propylene copolymer.

11. The process according to claim 1, wherein the first propylene-based polymer and the second propylene-based polymer are of the same type.

* * * * *